(12) United States Patent
Liang et al.

(10) Patent No.: US 11,527,354 B2
(45) Date of Patent: Dec. 13, 2022

(54) MAGNETIC INTEGRATED DEVICE, POWER CONVERSION CIRCUIT, CHARGER, AND ELECTRIC VEHICLE

(71) Applicant: Huawei Digital Power Technologies Co., Ltd., Guangdong (CN)

(72) Inventors: Yongtao Liang, Dongguan (CN); Weiping Liu, Dongguan (CN); Yanjun Zhi, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/588,202

(22) Filed: Jan. 28, 2022

(65) Prior Publication Data

US 2022/0157516 A1 May 19, 2022

Related U.S. Application Data

(63) Continuation of application No. PCT/CN2020/089871, filed on May 12, 2020.

(30) Foreign Application Priority Data

Aug. 14, 2019 (CN) .......................... 201910750681.6

(51) Int. Cl.
*H01F 27/38* (2006.01)
*H02M 1/00* (2006.01)
(Continued)

(52) U.S. Cl.
CPC ........... *H01F 27/38* (2013.01); *H01F 27/346* (2013.01); *H02M 1/0074* (2021.05); *H02M 3/285* (2013.01)

(58) Field of Classification Search
CPC .. H02M 1/0064; H02M 3/285; H02M 1/0074; H01F 27/38; H01F 37/346
See application file for complete search history.

(56) References Cited

U.S. PATENT DOCUMENTS

| 5,633,577 A | * | 5/1997 | Matsumae | ........ H02M 3/33592 320/138 |
|---|---|---|---|---|
| 2010/0067263 A1 | | 3/2010 | Qian et al. | |
| 2013/0343091 A1 | * | 12/2013 | Njiende T. | .............. H02M 3/01 336/170 |

FOREIGN PATENT DOCUMENTS

| CN | 101355308 A | 1/2009 |
|---|---|---|
| CN | 101720160 A | 6/2010 |

(Continued)

*Primary Examiner* — Rafael O Leon De Domenech
(74) *Attorney, Agent, or Firm* — Huawei Digital Power Technologies Co., Ltd.

(57) ABSTRACT

This application provides a magnetic integrated device, a power conversion circuit, a charger, and an electric vehicle, and pertains to the field of power electronics technologies. The magnetic integrated device includes a magnetic core, a first transformer winding, and a second transformer winding, where the first transformer winding and the second transformer winding are separated and wound, and a first air gap is formed at separation. A magnetic line may pass through the first air gap to form leakage inductance, and the leakage inductance may be equivalent to resonant inductance in the power conversion circuit. Therefore, there is no need to separately dispose an inductor winding in the magnetic integrated device. This effectively reduces a volume and a weight of the magnetic integrated device. In addition, the power conversion circuit that uses the magnetic integrated device also has a relatively small volume and relatively high-power density.

23 Claims, 8 Drawing Sheets

(51) Int. Cl.
*H01F 27/34* (2006.01)
*H02M 3/28* (2006.01)

(56) References Cited

FOREIGN PATENT DOCUMENTS

| | | |
|---|---|---|
| CN | 103515066 A | 1/2014 |
| CN | 108109821 A | 6/2018 |
| CN | 108736734 A | 11/2018 |
| CN | 110040028 A | 7/2019 |
| CN | 110634655 A | 12/2019 |
| EP | 0727794 A1 | 8/1996 |
| EP | 2677526 A1 | 12/2013 |
| EP | 3054593 A1 | 8/2016 |
| EP | 3346476 A1 | 7/2018 |
| FR | 2730849 A1 | 8/1996 |
| WO | 2019109572 A1 | 6/2019 |

\* cited by examiner

MAGNETIC INTEGRATED DEVICE, POWER CONVERSION CIRCUIT, CHARGER, AND ELECTRIC VEHICLE

CROSS-REFERENCE TO RELATED APPLICATIONS

This application is a continuation of International Application No. PCT/CN2020/089871, filed on May 12, 2020, which claims priority to Chinese Patent Application No. 201910750681.6, filed on Aug. 14, 2019, the disclosures of the aforementioned applications are hereby incorporated by reference in their entireties.

TECHNICAL FIELD

This application relates to the field of power electronics technologies, and in particular, to a magnetic integrated device, a power conversion circuit, a charger, and an electric vehicle.

BACKGROUND

A magnetic integrated device is a device integrating a plurality of discrete devices (such as an inductor and a transformer) in a power conversion circuit.

The magnetic integrated device includes a magnetic core, an inductor winding wound around the magnetic core, and a transformer winding wound around the magnetic core. The transformer winding generally includes three windings: a direct current bus side winding, a high-voltage winding, and a low-voltage winding.

Because the magnetic integrated device has a relatively large quantity of windings and occupies relatively large space, a volume of the magnetic integrated device is relatively large.

SUMMARY

This application provides a magnetic integrated device, a power conversion circuit, a charger, and an electric vehicle, to resolve a problem in a related technology that a volume of the magnetic integrated device is relatively large. Technical solutions are as follows.

According to one aspect, a magnetic integrated device is provided, including a magnetic core, a first transformer winding, and a second transformer winding, where a window is disposed in the magnetic core, and the first transformer winding and the second transformer winding respectively pass through the window and are wound around the magnetic core and the first transformer winding and the second transformer winding are separated and wound, and a first air gap is formed at separation.

A magnetic line may pass through the first air gap to form leakage inductance, and the leakage inductance may be equivalent to resonant inductance in the power conversion circuit. Therefore, there is no need to separately dispose an inductor winding in the magnetic integrated device. This effectively reduces a volume and a weight of the magnetic integrated device. In addition, the power conversion circuit that uses the magnetic integrated device also has a relatively small volume and relatively high-power density.

Optionally, the magnetic integrated device may further include a third transformer winding, where the third transformer winding passes through the window and is wound around the magnetic core. Correspondingly, the magnetic integrated device may be applied to a three-port power conversion circuit.

Optionally, the third transformer winding and the second transformer winding are wound in a laminated manner.

A winding manner of winding in the laminated manner can reduce occupied space of the transformer windings. This can effectively reduce the volume of the magnetic integrated device. In addition, the winding manner can ensure that the third transformer winding and the second transformer winding are tightly coupled.

Optionally, the third transformer winding may be flat, and the third transformer winding may cover a surface of the second transformer winding, for example, a part of the surface of the second transformer winding, and a wiring terminal of the second transformer winding is not covered by the third transformer winding, to facilitate connection to an external circuit.

Optionally, both a quantity of turns of the first transformer winding and a quantity of turns of the second transformer winding are greater than a quantity of turns of the third transformer winding.

To be specific, the third transformer winding may be a winding configured to connect to an auxiliary battery with a relatively low voltage. One of the first transformer winding and the second transformer winding may be configured to connect to a direct current bus, and the other transformer winding may be configured to connect to a power battery.

Optionally, both a wire width of the first transformer winding and a wire width of the second transformer winding are less than a wire width of the third transformer winding.

Setting the wire width of the third transformer winding to a relatively large value can reduce resistance of the third transformer winding. This effectively reduces a voltage drop of the third transformer winding.

Optionally, the magnetic integrated device further includes a magnetic cylinder that is located in the window and located between the first transformer winding and the second transformer winding; and one side of the magnetic cylinder comes in contact with the magnetic core, and there is a gap between the other side of the magnetic cylinder and the magnetic core. For example, the magnetic cylinder and the magnetic core may be of an integrated structure.

By adjusting a volume of the magnetic cylinder, a size of the gap between the magnetic cylinder and the magnetic core may be adjusted, to adjust a size of the first air gap, so as to adjust leakage inductance of the magnetic integrated device.

Optionally, the magnetic core includes a first magnet and a second magnet, and a groove is formed on one or each of the first magnet and the second magnet; and the first magnet and the second magnet are disposed opposite to each other and enclose the window.

For example, the second magnet may be a U-shaped magnet on which the groove is formed, and no groove is formed on the first magnet.

Optionally, each transformer winding in the magnetic integrated device is wound around the first magnet and the second magnet. In addition, a quantity of turns of each transformer winding wound around the first magnet may be equal to a quantity of turns of each transformer winding wound around the second magnet. This ensures symmetry of an overall structure of the magnetic integrated device.

Optionally, the magnetic core may further be an integrated part disposed with a through groove, and the through groove is formed as the window.

Optionally, one end of the magnetic core is disposed with one or more second air gaps, and the second air gap is connected to the window.

By disposing the second air gap on the magnetic core, on one hand, a magnetic permeability of the magnetic core can be reduced, and on the other hand, a magnetic saturation phenomenon under a large alternating current signal or a direct current bias can be avoided, to better control inductance of the magnetic integrated device.

Optionally, the window may be a rectangular window.

According to another aspect, a power conversion circuit is provided. The power conversion circuit may include the magnetic integrated device provided in the foregoing aspect.

In the magnetic integrated device, a first transformer winding may be connected to a first port of the power conversion circuit, a second transformer winding may be connected to a second port of the power conversion circuit, and the first transformer winding and the second transformer winding are capable of transferring energy to each other through electromagnetic mutual inductance.

Optionally, the power conversion circuit may further include a third transformer winding passing through a window and wound around a magnetic core, where the third transformer winding is connected to a third port of the power conversion circuit, the third transformer winding and the first transformer winding are capable of transferring energy to each other through electromagnetic mutual inductance, and the third transformer winding and the second transformer winding are capable of transferring energy to each other through electromagnetic mutual inductance.

Optionally, the power conversion circuit may further include three chopper subcircuits, where each of the first transformer winding, the second transformer winding, and the third transformer winding is connected to one port by using one of the chopper subcircuits. The chopper subcircuit may be a bridge rectifier circuit.

Optionally, the power conversion circuit may further include a resonant element, where the resonant element is connected to one or both of the first transformer winding and the second transformer winding in the magnetic integrated device. To be specific, the power conversion circuit may be a resonant or quasi-resonant power conversion circuit.

Optionally, the resonant element may include a capacitor, where the capacitor may be connected in series to the first transformer winding or the second transformer winding in the magnetic integrated device.

Optionally, the resonant element may include a first capacitor and a second capacitor, where the first capacitor is connected in series to the first transformer winding in the magnetic integrated device, and the second capacitor is connected in series to the second transformer winding in the magnetic integrated device.

Optionally, the resonant element may include a capacitor and an inductor, where the capacitor is connected in series to the first transformer winding or the second transformer winding in the magnetic integrated device; and the inductor is connected in parallel to the first transformer winding or the second transformer winding.

According to still another aspect, a power conversion circuit is provided. The power conversion circuit has three ports, and the power conversion circuit includes a resonant element, a first transformer, and a second transformer where a primary side of the first transformer is connected in series to the resonant element, and a secondary side of the first transformer is connected to a first port of the three ports; and a primary side of the second transformer is connected in parallel to the first transformer and the resonant element that are connected in series, and is connected to a second port of the three ports, and a secondary side of the second transformer is connected to a third port of the three ports.

The first transformer and the resonant element are connected in series, and then connected in parallel to the primary side of the second transformer. Therefore, impact of the resonant element on an output voltage of the secondary side of the second transformer can be avoided. This ensures that a fluctuation range of the output voltage of the secondary side of the second transformer is relatively small, stability of the output voltage is high, and voltage regulation pressure of a post-stage circuit is reduced.

According to yet another aspect, a charger is provided, including an alternating current/direct current conversion circuit and the power conversion circuit provided in the foregoing aspects. A second port of the power conversion circuit is connected to the alternating current/direct current conversion circuit.

According to still yet another aspect, an electric vehicle is provided, including a power battery, an auxiliary battery, and the charger provided in the foregoing aspect. A first port of a power conversion circuit in the charger is connected to the power battery, and a third port is connected to the auxiliary battery.

In conclusion, the embodiments of this application provide a magnetic integrated device, a power conversion circuit, a charger, and an electric vehicle. The two transformer windings in the magnetic integrated device may be separated and wound, and the first air gap is formed at separation. The magnetic line may pass through the first air gap to form the leakage inductance, and the leakage inductance may be equivalent to the resonant inductance in the power conversion circuit. Therefore, there is no need to separately dispose the inductor winding in the magnetic integrated device. This effectively reduces the volume and the weight of the magnetic integrated device. In addition, the power conversion circuit that uses the magnetic integrated device also has the relatively small volume and the relatively high-power density.

DESCRIPTION OF EMBODIMENTS

The following describes in detail a magnetic integrated device provided in embodiments of this application with reference to accompanying drawings.

Figure 1:
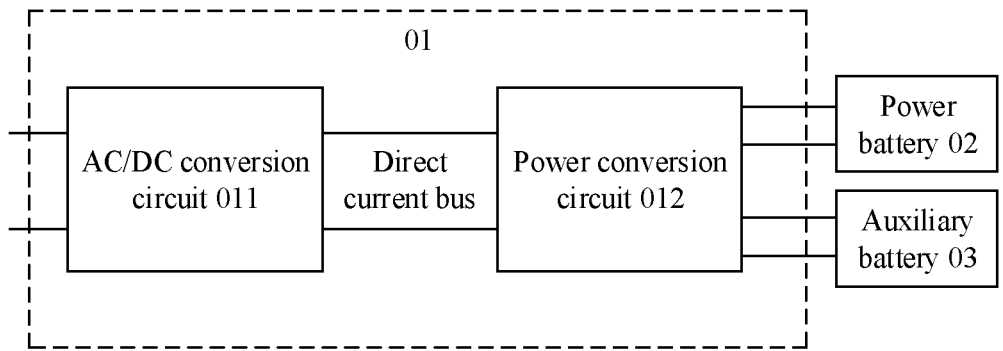
FIG. 1 is a schematic structural diagram of a charger according to an embodiment of this application.

FIG. 1 is a schematic structural diagram of a charger according to an embodiment of this application. As shown in FIG. 1, the charger 01 may include an alternating current/direct current (alternating current/direct current, AC/DC) conversion circuit 011 and a power conversion circuit 012. The power conversion circuit 012 may also be referred to as a DCDC power converter. One end of the AC/DC may be connected to an alternating current power supply, the other end may be connected to a direct current bus, and the direct current bus is connected to the power conversion circuit 012.

To improve power density, as shown in FIG. 1, the DCDC power converter 012 used in the charger 01 may be a three-port DCDC power converter. Three ports of the DCDC power converter 012 may be respectively configured to connect to the direct current bus, a power battery 02, and an auxiliary battery 03, and the DCDC power converter 012 can convert power between any two ports. The power battery 02 may be configured to supply power to a drive motor of a power-driven device. A voltage of the power battery 02 is relatively high, and is generally 300 V (V) to 600 V. Therefore, the power battery 02 may also be referred to as a high-voltage battery. The auxiliary battery 03 may be configured to supply power to another power-driven device (for example, an electronic braking system, a dashboard, and a light control system of an electric vehicle) in the power-driven device. A voltage of the auxiliary battery 03 is relatively low, and is generally 12 V to 15 V. Therefore, the auxiliary battery 03 may also be referred to as a low-voltage battery.

Figure 2:
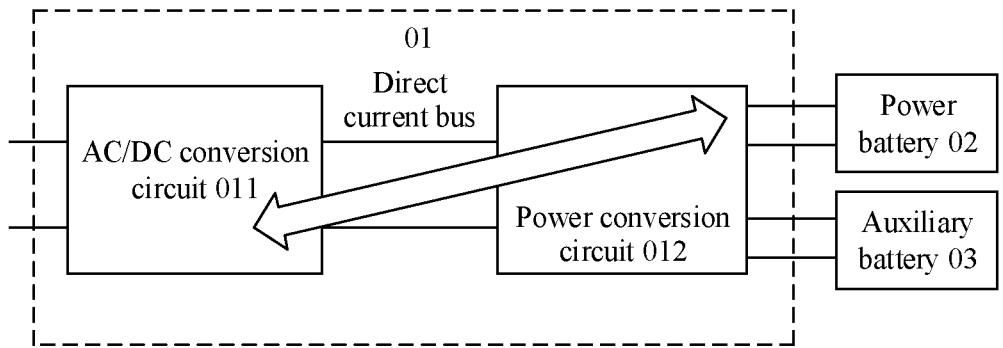
FIG. 2 is a schematic diagram of a charging mode of a charger according to an embodiment of this application.
Figure 3:
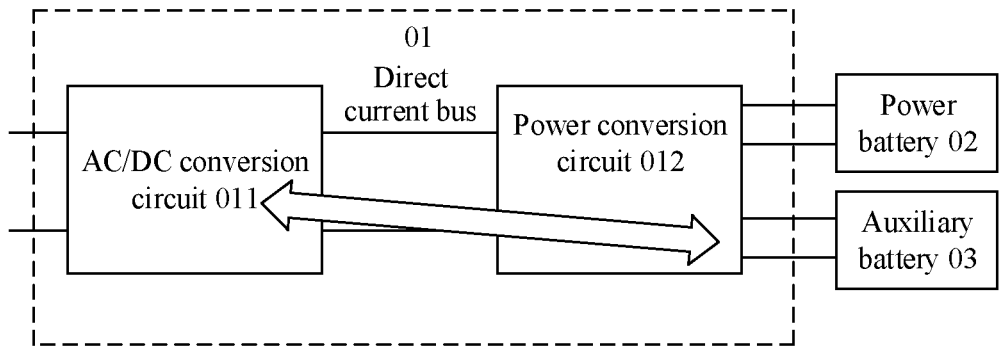
FIG. 3 is a schematic diagram of another charging mode of a charger according to an embodiment of this application.
Figure 4:
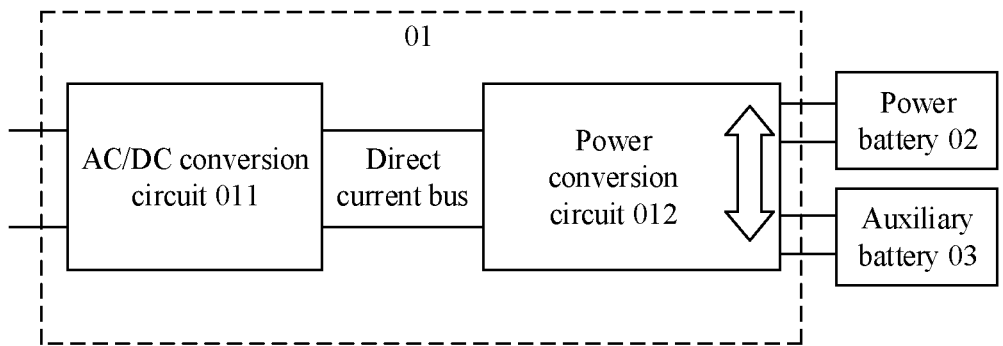
FIG. 4 is a schematic diagram of still another charging mode of a charger according to an embodiment of this application.
Figure 5:
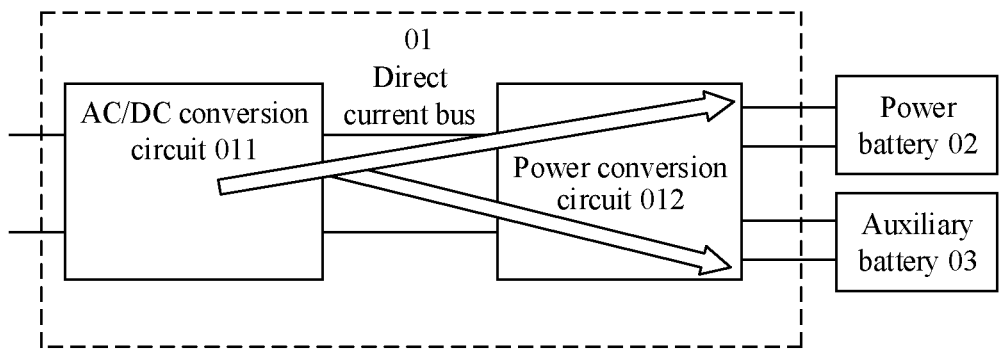
FIG. 5 is a schematic diagram of yet still another charging mode of a charger according to an embodiment of this application.
Figure 6:
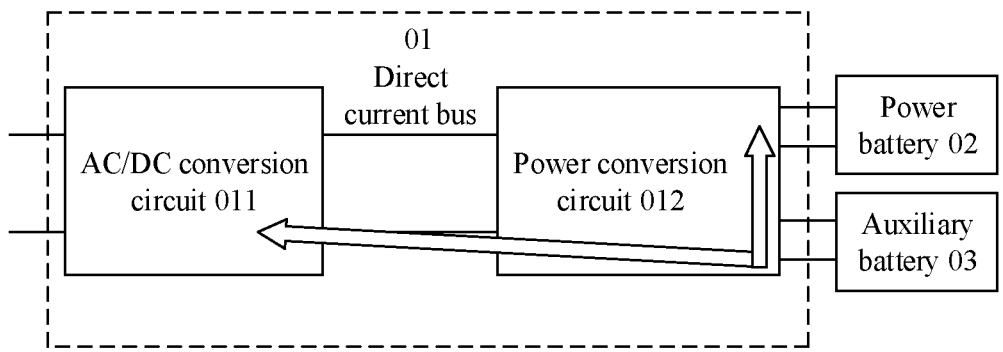
FIG. 6 is a schematic diagram of a further charging mode of a charger according to an embodiment of this application.
Figure 7:
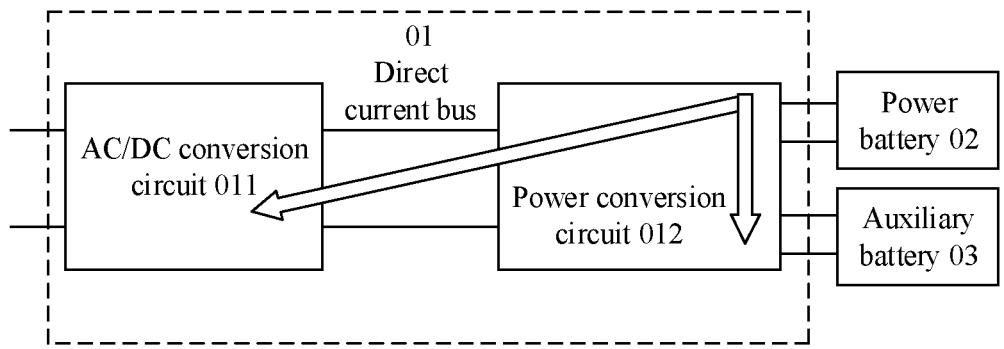
FIG. 7 is a schematic diagram of a still further charging mode of a charger according to an embodiment of this application.

The DCDC power converter 012 can convert power between any two ports. Therefore, as shown in FIG. 2, the charger 01 integrated with the DCDC power converter 012 can implement bidirectional power supply between the alternating current power supply and the power battery 02. Alternatively, as shown in FIG. 3, the charger 01 may implement bidirectional power supply between the alternating current power supply and the auxiliary battery 03. Alternatively, as shown in FIG. 4, the charger 01 may implement bidirectional power supply between the power battery 02 and the auxiliary battery 03. Alternatively, as shown in FIG. 5, the charger 01 may implement that the alternating current power supply supplies power to both the power battery 02 and the auxiliary battery 03. Alternatively, as shown in FIG. 6, the charger 01 may implement that the auxiliary battery 03 supplies power to both the alternating current power supply and the power battery 02. Alternatively, as shown in FIG. 7, the charger 01 may implement that the power battery 02 supplies power to both the alternating current power supply and the auxiliary battery 03.

In this embodiment of this application, to improve power conversion efficiency and power density of the DCDC power converter 012, the DCDC power converter 012 may be a resonant or quasi-resonant three-port DCDC power converter. In addition, to further reduce a size of a device, improve power density, improve an inter-adjustment feature of the power converter, and improve a voltage stabilizing capability of the power converter, a resonant inductor and a transformer in the resonant or quasi-resonant three-port DCDC power converter may be implemented by using a magnetic integrated device.

Optionally, the charger 01 provided in this embodiment of this application may be an on-board charger (on board charger, OBC) applied to the electric vehicle. Alternatively, the charger 01 may be further applied to another power-driven device, for example, a sweeping robot.

Figure 8:
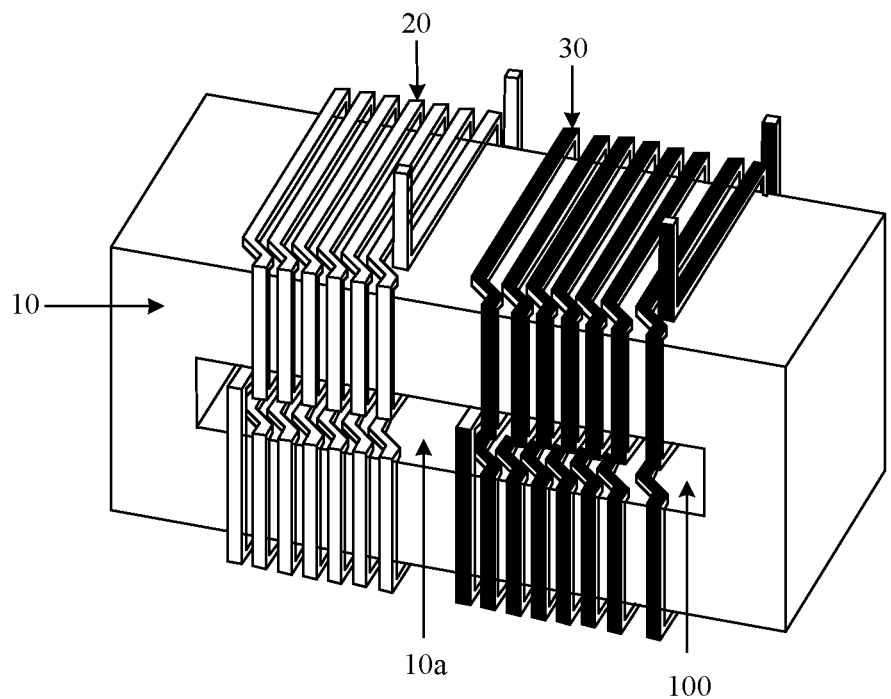
FIG. 8 is a schematic structural diagram of a magnetic integrated device according to an embodiment of this application.

FIG. 8 is a schematic structural diagram of a magnetic integrated device according to an embodiment of this application. The magnetic integrated device may be applied to a power conversion circuit, for example, the power conversion circuit 012 shown in any one of FIG. 1 to FIG. 7. Referring to FIG. 8, the magnetic integrated device may include a magnetic core 10, a first transformer winding 20, and a second transformer winding 30.

A window 100 is disposed in the magnetic core 10, and the first transformer winding 20 and the second transformer winding 30 respectively pass through the window 100 and are wound around the magnetic core 10. For example, as shown in FIG. 8, the window 100 may be a through groove disposed in the magnetic core 10.

The first transformer winding 20 and the second transformer winding 30 may be separated and wound on the magnetic core 10, and a first air gap 10a may be formed at separation.

A magnetic line generated by the first transformer winding 20 and a magnetic line generated by the second transformer winding 30 may pass through the first air gap 10a to form leakage inductance, and the leakage inductance may be equivalent to resonant inductance in the power conversion circuit. Therefore, there is no need to separately dispose an inductor winding in the magnetic integrated device. This effectively reduces a volume and a weight of the magnetic integrated device.

Figure 9:
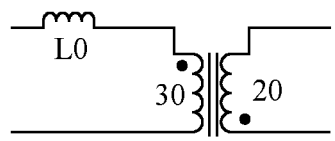
FIG. 9 is an equivalent circuit diagram of a magnetic integrated device according to an embodiment of this application.

For example, FIG. 9 is an equivalent circuit diagram of a magnetic integrated device according to an embodiment of this application. It can be seen from FIG. 9 that the first transformer winding 20 and the second transformer winding 30 may be equivalent to one two-port power converter. In addition, the leakage inductance formed by the first air gap 10a between the first transformer winding 20 and the second transformer winding 30 may be equivalent to a resonant inductor L0 connected in series to the second transformer winding 30.

In conclusion, the embodiments of this application provide a magnetic integrated device. The two transformer windings in the magnetic integrated device may be separated and wound, and the first air gap is formed at separation. The magnetic line may pass through the first air gap to form the leakage inductance, and the leakage inductance may be equivalent to the resonant inductance in the power conversion circuit. Therefore, there is no need to separately dispose the inductor winding in the magnetic integrated device. This effectively reduces the volume and the weight of the magnetic integrated device. In addition, the power conversion circuit that uses the magnetic integrated device also has a relatively small volume and relatively high-power density.

Figure 10:
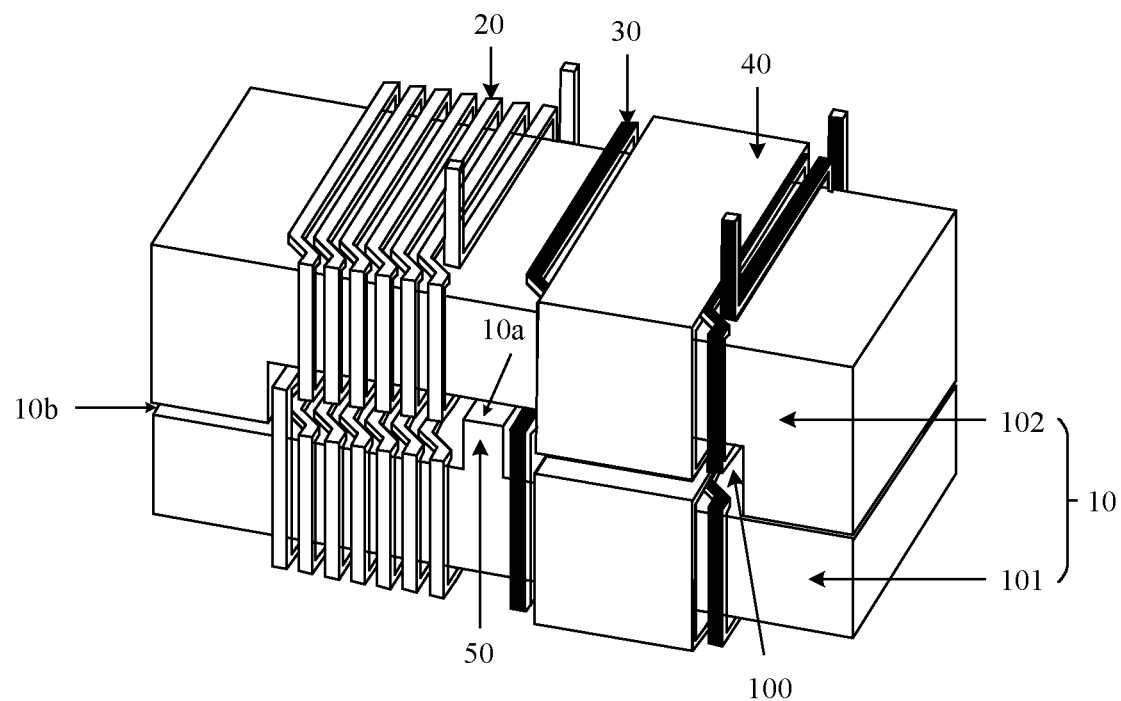
FIG. 10 is a schematic structural diagram of another magnetic integrated device according to an embodiment of this application.

Optionally, FIG. 10 is a schematic structural diagram of another magnetic integrated device according to an embodiment of this application. As shown in FIG. 10, the magnetic integrated device may further include a third transformer winding 40. The third transformer winding 40 may pass through the window 100 and be wound around the magnetic core 10.

Correspondingly, the first transformer winding 20, the second transformer winding 30, and the third transformer winding 40 may be equivalent to one three-port power converter.

Optionally, as shown in FIG. 10, the third transformer winding 40 and the second transformer winding 30 may be wound in a laminated manner. To be specific, the third transformer winding 40 and the second transformer winding 30 may be wound in a same-core manner. A winding manner of winding in the laminated manner can reduce occupied space of the transformer windings. This can effectively reduce the volume of the magnetic integrated device.

Figure 11:
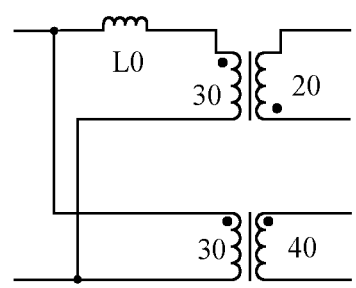
FIG. 11 is an equivalent circuit diagram of another magnetic integrated device according to an embodiment of this application.

FIG. 11 is an equivalent circuit diagram of a magnetic integrated device when a second transformer winding and a third transformer winding are wound in a laminated manner according to an embodiment of this application. It can be seen from FIG. 11 that this winding manner can ensure that the third transformer winding 40 and the second transformer winding 30 are tightly coupled, and there is no leakage inductance between the two transformer windings or there is only relatively small leakage inductance between the two transformer windings. This can effectively reduce power transmission losses between the two transformer windings, and further improve power transmission efficiency between the two transformer windings.

Certainly, the third transformer winding 40 may alternatively be separated from and wound around the second transformer winding 30 or the first transformer winding 20. For example, the first transformer winding 20, the second transformer winding 30, and the third transformer winding 40 may be separated and wound on the magnetic core 10 in sequence. A winding position of the third transformer winding 40 is not limited in this embodiment of this application.

In this embodiment of this application, one of the first transformer winding 20 and the second transformer winding 30 may be a winding configured to connect to a direct current bus, and the other winding may be a winding configured to connect to a power battery 02 or an auxiliary battery 03.

Figure 12:
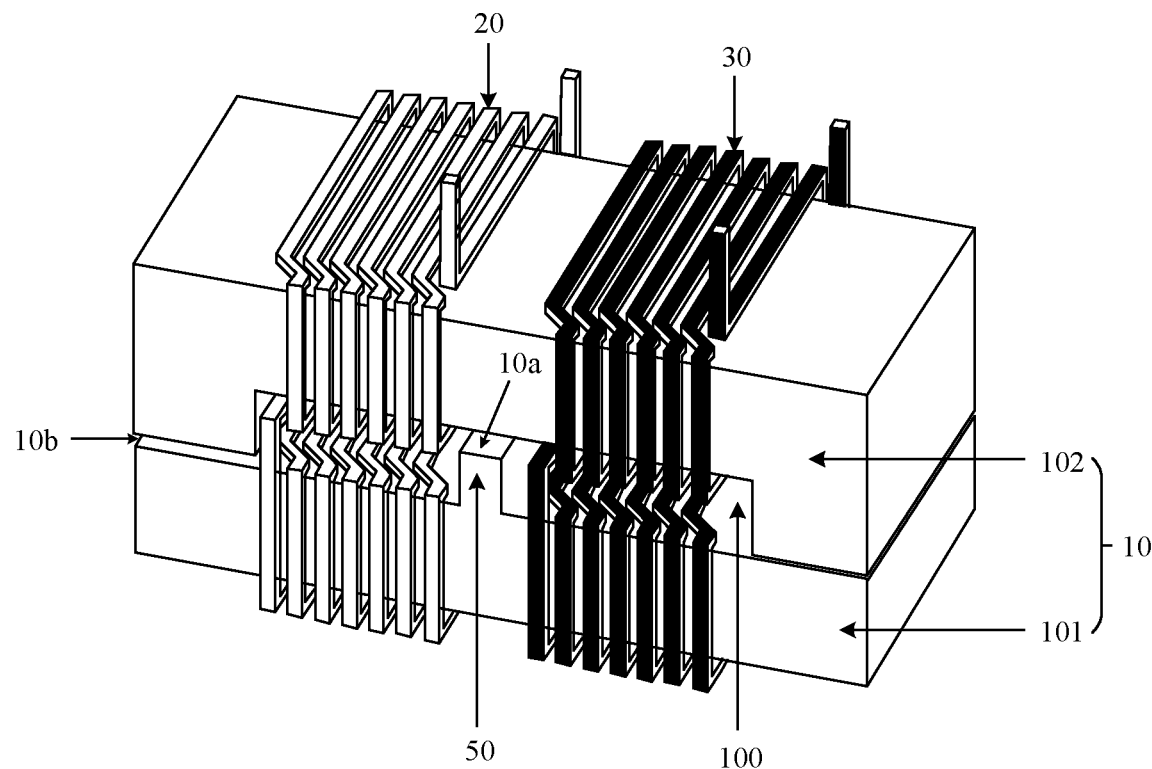
FIG. 12 is a schematic structural diagram of still another magnetic integrated device according to an embodiment of this application.

FIG. 12 is a schematic structural diagram of still another magnetic integrated device according to an embodiment of this application. It can be seen from FIG. 8, FIG. 10, and FIG. 12 that both a quantity of turns of the first transformer winding 20 and a quantity of turns of the second transformer winding 30 may be greater than a quantity of turns of the third transformer winding 40. To be specific, the third transformer winding 40 may be a winding configured to connect to an auxiliary battery 03 with a relatively low voltage.

Optionally, the first transformer winding 20 may be configured to connect to a power battery 02, and the second transformer winding 30 may be configured to connect to the direct current bus. It can be seen from FIG. 11 that, when the third transformer winding 40 and the second transformer winding 30 are wound in the laminated manner, the third transformer winding 40 (namely, a winding on a side of the auxiliary battery 03) may skip the resonant inductor L0 and be directly coupled to the direct current bus.

A voltage of the direct current bus is relatively stable. Therefore, it can be ensured that a voltage of the winding on the side of the auxiliary battery 03 is also relatively stable. This avoids impact of the resonant inductor L0 on a voltage on a low-voltage side, and reduces a voltage fluctuation range on the low-voltage side. In this way, voltage regulation pressure of a post-stage DCDC voltage stabilizing circuit is reduced.

In this embodiment of this application, the third transformer winding 40 may be configured to connect to the auxiliary battery 03, and a current in the third transformer winding 40 is relatively small. Therefore, as shown in FIG. 10, both a wire width of the first transformer winding 20 and a wire width of the second transformer winding 30 may be less than a wire width of the third transformer winding 40. To be specific, the wire width of the third transformer winding 40 may be a relatively large value, and resistance may be a relatively small value. This can effectively reduce a voltage drop of the third transformer winding 40.

For example, still referring to FIG. 10, the third transformer winding 40 may be flat, to be specific, the third transformer winding 40 may be of a bent laminated structure, and the quantity of turns of the third transformer winding 40 may be equal to 1 or 2. The third transformer winding 40 may cover a surface of the second transformer winding 30, to be specific, the third transformer winding 40 may be wound on a side that is of the second transformer winding 30 and that is away from the magnetic core 10. For example, the flat third transformer winding 40 may cover a part of the surface of the second transformer winding 30, and a wiring terminal of the second transformer winding 30 may not be covered by the third transformer winding 40, to facilitate connection to an external circuit.

The third transformer winding 40 has a relatively small quantity of turns and a relatively large wire width, but the second transformer winding 30 has a relatively large quantity of turns and a relatively small wire width. Therefore, the third transformer winding 40 is wound on the side that is of the second transformer winding 30 and that is away from the magnetic core 10. To be specific, the third transformer winding 40 is wound on an outer side of the second transformer winding 30, to facilitate winding of each winding and connection of a post-stage circuit.

Optionally, as shown in FIG. 10 and FIG. 12, the magnetic core 10 may include a first magnet 101 and a second magnet 102. A groove or grooves is disposed in one or each of the first magnet 101 and the second magnet 102. In other words, the groove is formed in at least one of the two magnets. The first magnet 101 and the second magnet 102 are disposed opposite to each other and enclose the window 100. In addition, the first magnet 101 and the second magnet 102 may be bonded and fastened.

For example, it can be seen from FIG. 10 and FIG. 12 that one groove may be formed in the second magnet 102, to be specific, the second magnet 102 may be a U-shaped magnet. No groove is formed in the first magnet 101, and the first magnet 101 may be located on a side on which the groove is formed in the second magnet 102, to enclose the window 100 with the second magnet 102.

In this embodiment of this application, it can be seen from FIG. 10 and FIG. 12 that each transformer winding in the magnetic integrated device may be wound around the first magnet 101 and the second magnet 102. For example, referring to FIG. 12, the first transformer winding 20, the second transformer winding 30, and the third transformer winding 40 included in the magnetic integrated device are respectively wound around the first magnet 101 and the second magnet 102. In addition, a part that is of the second transformer winding 30 and that is wound around each magnet is covered by the third transformer winding 40.

Optionally, a quantity of turns of each transformer winding in the magnetic integrated device wound around the first magnet 101 may be equal to or close to a quantity of turns of each transformer winding wound around the second magnet 102. For example, a difference between the quantities of turns of each transformer winding wound around the two magnets may be less than a turn quantity threshold, and the turn quantity threshold may be 2 or 5. This is not limited in this embodiment of this application.

This ensures symmetry of an overall structure of the magnetic integrated device by setting the quantities of turns of each transformer winding wound around the two magnets to be equal or close.

It should be noted that, in this embodiment of this application, the quantity of turns of each transformer winding may be a sum of the quantities of turns of the transformer winding wound around the two magnets.

Optionally, as shown in FIG. 8, FIG. 10, and FIG. 12, the window 100 formed in the magnetic core 10 may be a rectangular window. To be specific, an orthographic projection shape of the window 100 on a plane on which an opening of the window 100 is located may be a rectangle. Certainly, the window 100 may alternatively be a circular window or another polygon window. A shape of the window is not limited in this embodiment of this application.

Figure 13:
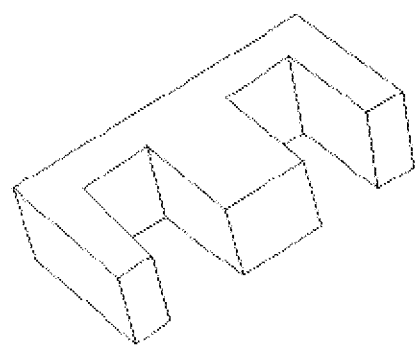
FIG. 13 is a schematic structural diagram of a magnet according to an embodiment of this application.
Figure 14:
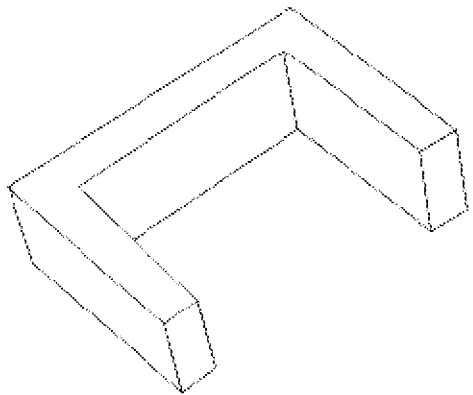
FIG. 14 is a schematic structural diagram of another magnet according to an embodiment of this application.
Figure 15:
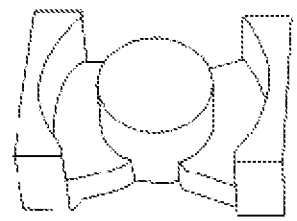
FIG. 15 is a schematic structural diagram of still another magnet according to an embodiment of this application.

It should be noted that in this embodiment of this application, structures of the first magnet 101 and the second magnet 102 may be flexibly disposed based on a situation. For example, either of the first magnet 101 and the second magnet 102 may be an E-type magnet shown in FIG. 13, a U-type magnet shown in FIG. 14, or a PQ-type magnet shown in FIG. 15. A shape of each magnet is not limited in this embodiment of this application. When either of the first magnet 101 and the second magnet 102 is the E-type magnet or the PQ-type magnet, the window 100 enclosed by the two magnets may be an irregular polygon.

It should be further noted that, in this embodiment of this application, the magnetic core 10 may alternatively be an integrated part disposed with a through groove. For example, referring to FIG. 8, the magnetic core 10 may be of a cube structure in which the through groove is disposed. To be specific, the magnetic core 10 may be of a "square" shape structure. The through groove is formed as the window 100.

Optionally, referring to FIG. 10 and FIG. 12, the magnetic integrated device may further include a magnetic cylinder 50. The magnetic cylinder 50 may be located in the window 100, and located between the first transformer winding 20 and the second transformer winding 30. One side of the magnetic cylinder 50 comes in contact with the magnetic core 10, and there is a gap between the other side and the magnetic core 10. The gap is the first air gap 10a between the first transformer winding 20 and the second transformer winding 30.

For example, as shown in FIG. 10 and FIG. 12, the magnetic cylinder 50 may be located on a side that is of the first magnet 101 and that is close to the second magnet 102, and there is a gap between the magnetic cylinder 50 and the second magnet 102.

Alternatively, the magnetic cylinder 50 may be located on a side that is of the second magnet 102 and that is close to the first magnet 101, and there is a gap between the magnetic cylinder 50 and the first magnet 101.

Alternatively, the magnetic integrated device may include two magnetic cylinders 50. One of the magnetic cylinders 50 is located on a side that is of the first magnet 101 and that is close to the second magnet 102, and the other magnetic cylinder 50 is located on a side that is of the second magnet 102 and that is close to the first magnet 101. In addition, there is a gap between the two magnetic cylinders 50, to ensure that the first air gap 10a may be formed between the first transformer winding 20 and the second transformer winding 30.

In this embodiment of this application, the magnetic cylinder 50 may be of a cube structure. In addition, a volume of the magnetic cylinder 50 may be adjusted based on a requirement for a value of the resonant inductance in the power conversion circuit to which the magnetic integrated device is applied, to adjust a size of the gap (namely, the first air gap 10a) between the magnetic cylinder 50 and the magnetic core 10, so as to adjust the leakage inductance of the magnetic integrated device.

For example, when the volume of the magnetic cylinder 50 is relatively small, and the gap between the magnetic cylinder 50 and the magnetic core 10 is relatively large, the leakage inductance of the magnetic integrated device is relatively large. When the volume of the magnetic cylinder 50 is relatively large, and the gap between the magnetic cylinder 50 and the magnetic core 10 is relatively small, the leakage sensation of the magnetic integrated device is relatively small.

Optionally, the magnetic cylinder 50 and the magnetic core 10 may be an integrated structure. In other words, the magnetic cylinder 50 and the magnetic core 10 may be integrally formed. For example, as shown in FIG. 10 and FIG. 12, the magnetic cylinder 50 and the first magnet 101 may be of a T-shaped integrated structure.

In this embodiment of this application, as shown in FIG. 10 and FIG. 12, one or more second air gaps 10b may be further disposed at one end of the magnetic core 10, and the second air gap 10b may be connected to the window 100.

The second air gap 10b may be disposed at the end that is of the magnetic core 10 and that is close to the first transformer winding 20 or at one end that is of the magnetic core 10 and that is close to the second transformer winding 30. Alternatively, the second air gaps 10b may be disposed at both ends of the magnetic core 10.

For example, in the magnetic integrated device shown in FIG. 10 and FIG. 12, one second air gap 10b may be disposed at the end that is of the magnetic core 10 and that is close to the first transformer winding 20. The second air gap 10b may be formed by a gap between the first magnet 101 and the second magnet 102.

By disposing the second air gap 10b on the magnetic core 10, on one hand, a magnetic permeability of the magnetic core 10 can be reduced, and on the other hand, a magnetic saturation phenomenon under a large alternating current signal or a direct current bias can be avoided, to better control inductance of the magnetic integrated device.

In conclusion, the embodiments of this application provide a magnetic integrated device. The two transformer windings in the magnetic integrated device may be separated and wound, and the first air gap is formed at separation. The magnetic line may pass through the first air gap to form the leakage inductance, and the leakage inductance may be equivalent to the resonant inductance in the power conversion circuit. Therefore, there is no need to separately dispose the inductor winding in the magnetic integrated device. This effectively reduces the volume and the weight of the magnetic integrated device. In addition, the power conversion circuit that uses the magnetic integrated device also has the relatively small volume and the relatively high-power density, and the power conversion circuit has a relatively good inter-adjustment feature and a relatively high voltage stabilizing capability.

Figure 16:
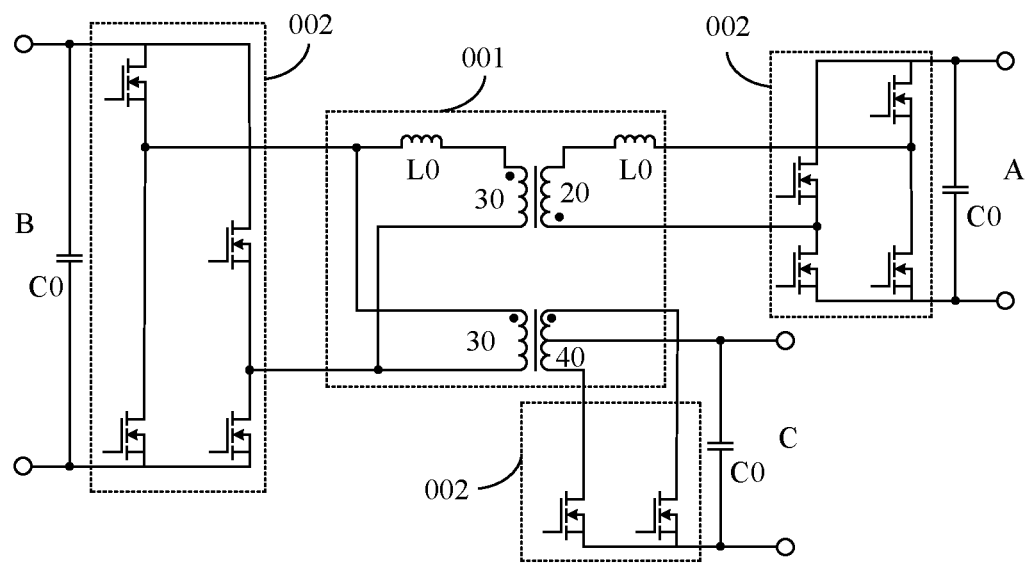
FIG. 16 is a circuit diagram of a power conversion circuit according to an embodiment of this application.

FIG. 16 is a circuit diagram of a power conversion circuit according to an embodiment of this application. As shown in FIG. 16, the power conversion circuit may include the magnetic integrated device 001 provided in the foregoing embodiments. The magnetic integrated device 001 may be the magnetic integrated device shown in FIG. 8, FIG. 10, or FIG. 12. Referring to FIG. 16, the power conversion circuit may have at least two ports A and B. In other words, the power conversion circuit may be at least a two-port power conversion circuit. In the magnetic integrated device 001, a first transformer winding 20 may be connected to the first port A of the power conversion circuit, and a second transformer winding 30 may be connected to the second port B of the power conversion circuit. In addition, the first transformer winding 20 and the second transformer winding 30 are capable of transferring energy to each other through electromagnetic mutual inductance, and convert power.

Optionally, referring to FIG. 16, the power conversion circuit may further include a third port C, and the magnetic integrated device 001 may further include a third transformer winding 40. The third transformer winding 40 may be connected to the third port C.

In addition, the third transformer winding 40 and the first transformer winding 20 are capable of transferring energy to each other through electromagnetic mutual inductance, and convert power. The third transformer winding 40 and the second transformer winding 30 are also capable of transferring energy to each other through electromagnetic mutual inductance, and convert power.

Optionally, as shown in FIG. 16, the power conversion circuit may further include three chopper subcircuits 002. Each chopper subcircuit 002 may be separately connected to one port and one transformer winding in the magnetic integrated device 001. To be specific, each transformer winding may be connected to one port of the power conversion circuit by using one chopper subcircuit 002.

For example, referring to FIG. 16, it is assumed that the first port A of the power conversion circuit is configured to connect to a power battery, the second port B is configured to connect to a direct current bus, and the third port C is configured to connect to an auxiliary battery. In this case, each of the chopper subcircuit 002 connected between the first port A and the first transformer winding 20 and the chopper subcircuit 002 connected between the second port B and the second transformer winding 30 may be a bridge rectifier circuit, and the bridge rectifier circuit may include four switch devices connected in a bridge manner. The chopper subcircuit 002 connected between the third port C and the third transformer winding 40 may be a double half-wave rectifier circuit including two switch devices, or may be a bridge rectifier circuit.

The switch device included in the chopper subcircuit 002 may be a metal-oxide-semiconductor field-effect transistor (metal oxide semiconductor field effect transistor, MOSFET), an insulated gate bipolar transistor (insulated gate bipolar transistor, IGBT), a gallium nitride (GaN)-based high-electron-mobility transistor (High Electron Mobility Transistor, HEMT), or the like, and the MOSFET may be a silicon carbide (SiC) MOSFET or the like.

Optionally, still referring to FIG. 16, the power conversion circuit may further include three filter capacitors C0. Each filter capacitor C0 may be connected in parallel to an input terminal of one chopper subcircuit 002.

In this embodiment of this application, the power conversion circuit may further include a resonant element, and the resonant element may be connected to the magnetic integrated device 001, to constitute a resonant circuit. To be specific, the power conversion circuit may be a resonant or quasi-resonant power conversion circuit.

Figure 17:
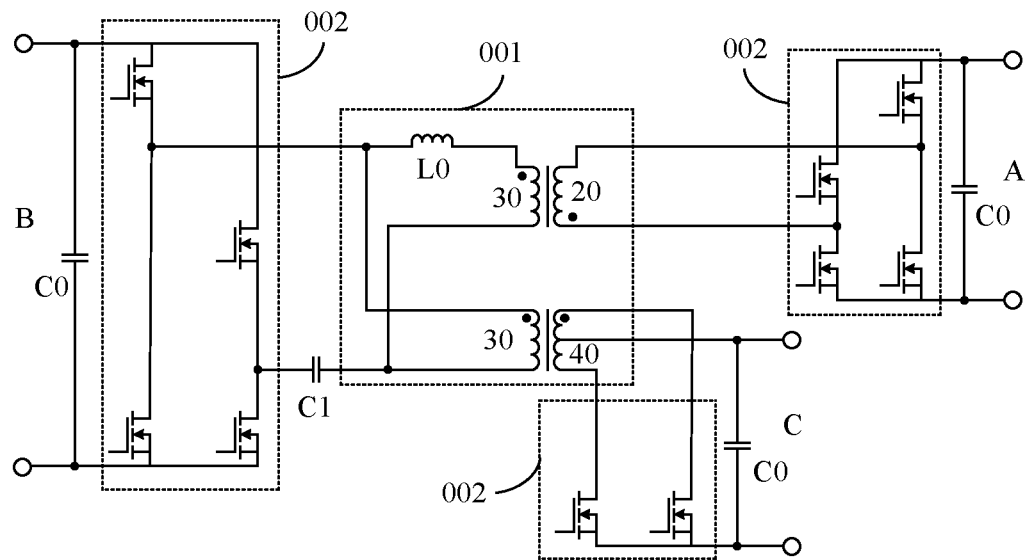
FIG. 17 is a circuit diagram of another power conversion circuit according to an embodiment of this application.

In an optional implementation, as shown in FIG. 17, the resonant element may include a capacitor C1, and the capacitor C1 may be connected in series to the first transformer winding 20 or the second transformer winding 30 in the magnetic integrated device 001. For example, in the circuit diagram shown in FIG. 17, the capacitor C1 and the second transformer winding 30 are connected in series.

A power conversion circuit using this structure may be referred to as an LLC resonant power conversion circuit, or may be referred to as a series-parallel resonant power conversion circuit. L represents an inductor, and C represents a capacitor.

Figure 18:
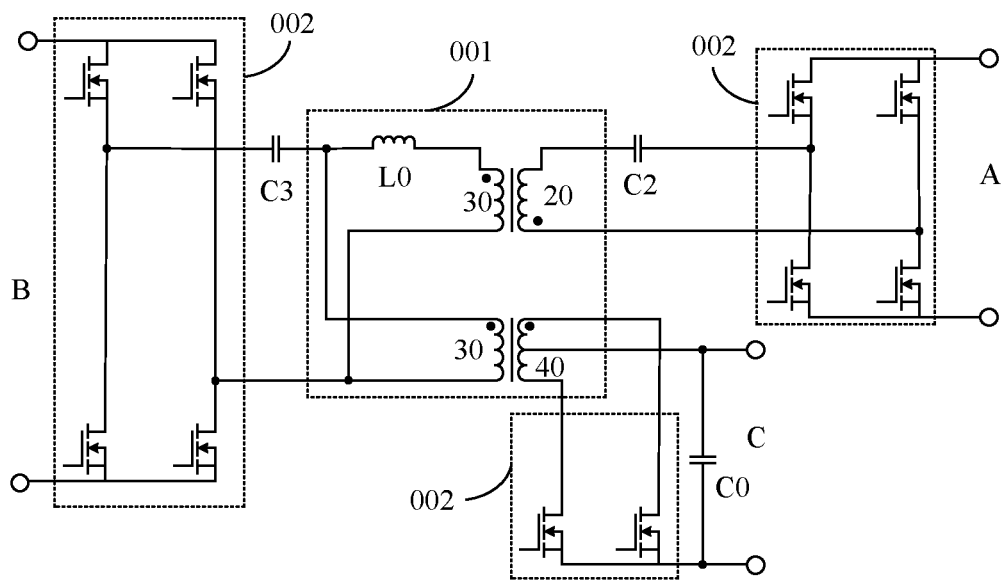
FIG. 18 is a circuit diagram of still another power conversion circuit according to an embodiment of this application.

In another optional implementation, as shown in FIG. 18, the resonant element may include a first capacitor C2 and a second capacitor C3. The first capacitor C2 may be connected in series to the first transformer winding 20 in the magnetic integrated device 001, and the second capacitor C3 may be connected in series to the second transformer winding 30 in the magnetic integrated device 001.

A power conversion circuit using this structure may also be referred to as a CLLC resonant power conversion circuit.

Figure 19:
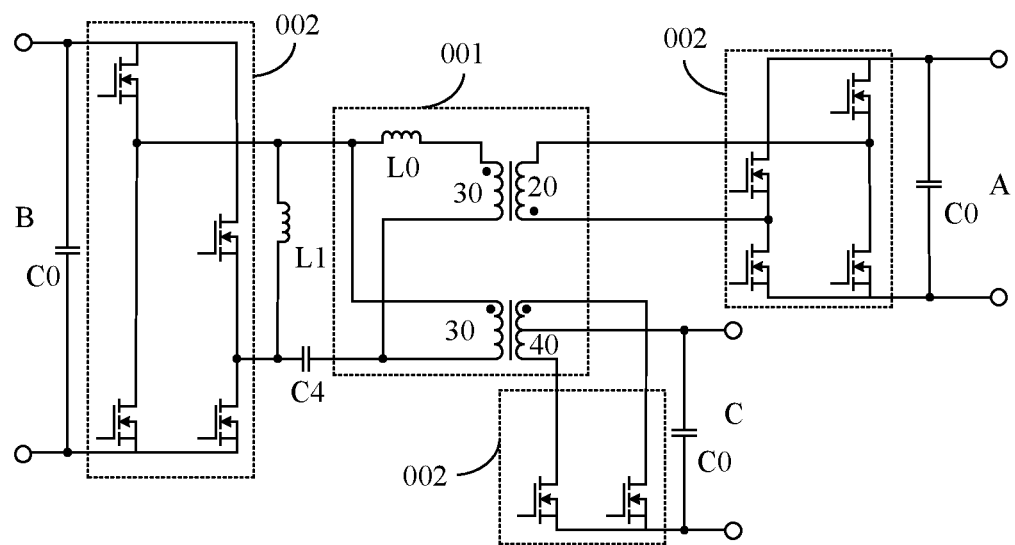
FIG. 19 is a circuit diagram of yet another power conversion circuit according to an embodiment of this application.

In still another optional implementation, as shown in FIG. 19, the resonant element may include a capacitor C4 and an inductor L1. The capacitor C4 may be connected in series to the first transformer winding 20 or the second transformer winding 30 in the magnetic integrated device 001, and the inductor L1 may be connected in parallel to the first transformer winding 20 or the second transformer winding 30. For example, in a structure shown in FIG. 19, the capacitor C4 is connected in series to the second transformer winding 30, and the inductor L1 is connected in parallel to the second transformer winding 30.

A power conversion circuit using this structure may be referred to as an L-LLC resonant power conversion circuit.

In yet another optional implementation, as shown in FIG. 16, no additional resonant element may be disposed in the power conversion circuit, and the leakage inductance in the magnetic integrated device may be equivalent to two resonant inductors L0. The two resonant inductors L0 are respectively connected in series to the first transformer winding 20 and the second transformer winding 30. A power conversion circuit using this structure may also be referred to as a dual active full bridge (dual active bridge, DAB) power conversion circuit.

In conclusion, the embodiments of this application provide a power conversion circuit. In the magnetic integrated device used in the power conversion circuit, the two transformer windings may be separated and wound, and a first air gap is formed at separation. A magnetic line may pass through the first air gap to form leakage inductance, and the leakage inductance may be equivalent to resonant inductance in the power conversion circuit. Therefore, there is no need to separately dispose an inductor winding in the magnetic integrated device. This effectively reduces a volume and a weight of the magnetic integrated device. In addition, the power conversion circuit that uses the magnetic integrated device has a relatively small volume and relatively high-power density.

Figure 20:
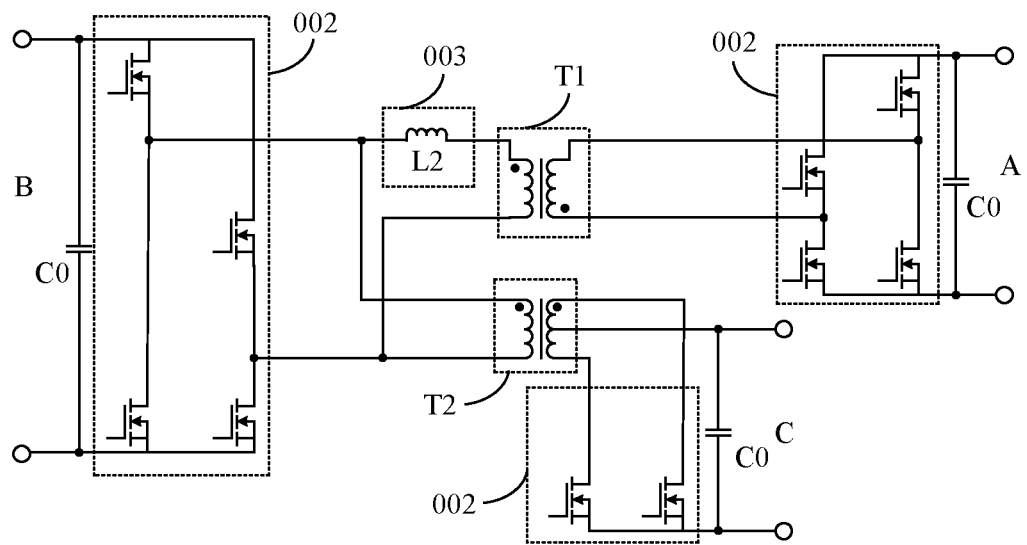
FIG. 20 is a circuit diagram of a still yet power conversion circuit according to an embodiment of this application.

FIG. 20 is a circuit diagram of still yet power conversion circuit according to an embodiment of this application. As shown in FIG. 20, the power conversion circuit has three ports: A, B, and C. In other words, the power conversion circuit is a three-port power conversion circuit. The power conversion circuit may include a resonant element 003, a first transformer T1, and a second transformer T2.

A primary side of the first transformer T1 may be connected in series to the resonant element 003 and the first transformer T1 and the resonant element 003 that are connected in series may be connected to the second port B of the three ports, and a secondary side of the first transformer T1 may be connected to the first port A of the three ports.

A primary side of the second transformer T2 may be connected in parallel to the first transformer T1 and the resonant element 003 that are connected in series. For example, in a structure shown in FIG. 20, the resonant element 003 may be an inductor L2. In addition, the primary side of the second transformer T2 is further connected to the second port B of the three ports, and a secondary side of the second transformer T2 may be connected to the third port C of the three ports.

The first transformer T1 and the resonant element 003 are connected in series, and then connected in parallel to the primary side of the second transformer T2. Therefore, impact of the resonant element 003 on an output voltage of the secondary side of the second transformer T2 can be avoided. This ensures that a fluctuation range of the output voltage of the secondary side of the second transformer T2 is relatively small, stability of the output voltage is relatively high, and voltage regulation pressure of a post-stage circuit is further reduced.

It can be learned from the foregoing analysis that in this embodiment of this application, a discrete device may be further used to implement a topology of a power conversion circuit using a magnetic integrated device.

Optionally, in this embodiment of this application, the second port B of the power conversion circuit may be configured to connect to a direct current bus, the first port A may be configured to connect to a power battery, and the third port C may be configured to connect to an auxiliary battery.

It should be noted that, in addition to the resonant element 003, the power conversion circuit may further include another resonant element, for example, an inductor and a capacitor, to implement a topology of the power conversion circuit shown in any one of FIG. 16 to FIG. 19. Details are not described in this embodiment of this application.

An embodiment of this application further provides a charger. As shown in FIG. 1 to FIG. 7, the charger may include the alternating current/direct current conversion circuit 011 and the power conversion circuit 012. The power conversion circuit 012 may be the circuit shown in any one of FIG. 16 to FIG. 20. A second port B of the power conversion circuit 012 may be connected to the alternating current/direct current conversion circuit 011, for example, may be connected to the alternating current/direct current conversion circuit 011 by using the direct current bus.

Optionally, the charger may be applied to an electric vehicle, or may be applied to another power-driven device, for example, a sweeping robot.

An embodiment of this application further provides an electric vehicle. Referring to FIG. 1 to FIG. 7, the electric vehicle may include the power battery 02, the auxiliary battery 03, and the charger 01. The charger 01 may be separately connected to the power battery 02 and the auxiliary battery 03. For example, a first port A of the power conversion circuit 012 included in the charger 01 may be connected to the power battery 02, and a third port C of the power conversion circuit 012 included in the charger 01 may be connected to the auxiliary battery 03.

Optionally, the electric vehicle may be an electric automobile, an electric motorcycle, an electric bicycle, or the like. This is not limited in this embodiment of this application.

The foregoing descriptions are merely optional embodiments of this application, but are not intended to limit this application. Any modification, equivalent replacement, or improvement made without departing from the spirit and principle of this application should fall within the protection scope of this application.

In addition, techniques, systems, subsystems, and methods described and illustrated in the various embodiments as discrete or separate may be combined or integrated with other systems, modules, techniques, or methods without departing from the scope of the present disclosure. Other items shown or discussed as connected, coupled, or directly coupled or communicating with each other may be indirectly connected or indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A magnetic integrated device, comprising:
   a magnetic core with a window in the magnetic core;
   a first transformer winding that passes through the window and is wound around the magnetic core;
   a second transformer winding that passes through the window and is wound around the magnetic core, wherein the first transformer winding and the second transformer winding are separated, and a first air gap is formed at separation between the first transformer winding and the second transformer winding; and
   a magnetic cylinder that is located in the window and located between the first transformer winding and the second transformer winding, wherein one side of the magnetic cylinder comes in contact with the magnetic core, and there is a gap between the other side of the magnetic cylinder and the magnetic core.

2. The magnetic integrated device according to claim 1, further comprising a third transformer winding, wherein the third transformer winding passes through the window and is wound around the magnetic core.

3. The magnetic integrated device according to claim 2, wherein the third transformer winding and the second transformer winding are wound in a laminated manner.

4. The magnetic integrated device according to claim 3, wherein the third transformer winding is flat, and the third transformer winding covers a surface of the second transformer winding.

5. The magnetic integrated device according to claim 4, wherein the third transformer winding covers a part of the surface of the second transformer winding, and a wiring terminal of the second transformer winding is not covered by the third transformer winding.

6. The magnetic integrated device according to claim 2, wherein both a quantity of turns of the first transformer winding and a quantity of turns of the second transformer winding are greater than a quantity of turns of the third transformer winding.

7. The magnetic integrated device according to claim 6, wherein both a wire width of the first transformer winding and a wire width of the second transformer winding are less than a wire width of the third transformer winding.

8. The magnetic integrated device according to claim 1, wherein the magnetic cylinder and the magnetic core are of an integrated structure.

9. The magnetic integrated device according to claim 1, wherein the magnetic core comprises a first magnet and a second magnet, and a groove is formed on one or each of the first magnet and the second magnet; and
the first magnet and the second magnet are disposed opposite to each other and enclose the window.

10. The magnetic integrated device according to claim 9, wherein each transformer winding in the magnetic integrated device is wound around the first magnet and the second magnet.

11. The magnetic integrated device according to claim 10, wherein a quantity of turns of each transformer winding wound around the first magnet is equal to a quantity of turns of each transformer winding wound around the second magnet.

12. The magnetic integrated device according to claim 1, wherein the magnetic core is an integrated part disposed with a through groove, and the through groove is formed as the window.

13. The magnetic integrated device according to claim 1, wherein one end of the magnetic core is disposed with one or more second air gaps, and the second air gap is connected to the window.

14. The magnetic integrated device according to claim 1, wherein the window is a rectangular window.

15. A power conversion circuit, comprising:
a magnetic core with a window in the magnetic core;
a first transformer winding that passes through the window and is wound around the magnetic core;
a second transformer winding that passes through the window and is wound around the magnetic core, wherein the first transformer winding and the second transformer winding are separated, and a first air gap is formed at separation between the first transformer winding and the second transformer winding;
a magnetic cylinder that is located in the window and located between the first transformer winding and the second transformer winding, wherein one side of the magnetic cylinder comes in contact with the magnetic core, and there is a gap between the other side of the magnetic cylinder and the magnetic core; and
a power conversion circuit comprising a first power conversion circuit port and a second power conversion circuit port, the first transformer winding coupled to the first power conversion circuit port, the second transformer winding is connected to the second conversion circuit port, and the first transformer winding and the second transformer winding are capable of transferring energy to each other through electromagnetic mutual inductance.

16. The power conversion circuit according to claim 15, further comprising a third transformer winding passing through the window and wound around the magnetic core, wherein
the third transformer winding is connected to a third port of the power conversion circuit, the third transformer winding and the first transformer winding are capable of transferring energy to each other through electromagnetic mutual inductance, and the third transformer winding and the second transformer winding are capable of transferring energy to each other through electromagnetic mutual inductance.

17. The power conversion circuit according to claim 16, further comprising three chopper subcircuits, wherein
each of the first transformer winding, the second transformer winding, and the third transformer winding is connected to one port by using one of the chopper subcircuits.

18. The power conversion circuit according to claim 15, further comprising a resonant element, wherein the resonant element is connected to one or both of the first transformer winding and the second transformer winding.

19. The power conversion circuit according to claim 18, wherein the resonant element comprises a capacitor, wherein
the capacitor is connected in series to the first transformer winding or the second transformer winding.

20. The power conversion circuit according to claim 18, wherein the resonant element comprises a first capacitor and a second capacitor, wherein
the first capacitor is connected in series to the first transformer winding, and the second capacitor is connected in series to the second transformer winding.

21. The power conversion circuit according to claim 18, wherein the resonant element comprises a capacitor and an inductor, wherein
the capacitor is connected in series to the first transformer winding or the second transformer winding; and
the inductor is connected in parallel to the first transformer winding or the second transformer winding.

22. A charger, comprising:
an alternating current/direct current conversion circuit; and
a power conversion circuit, comprising:
a magnetic core with a window in the magnetic core;
a first transformer winding that passes through the window and is wound around the magnetic core;
a second transformer winding that passes through the window and is wound around the magnetic core, wherein the first transformer winding and the second transformer winding are separated, and a first air gap is formed at separation between the first transformer winding and the second transformer winding;
a magnetic cylinder that is located in the window and located between the first transformer winding and the second transformer winding, wherein one side of the magnetic cylinder comes in contact with the magnetic core, and there is a gap between the other side of the magnetic cylinder and the magnetic core; and
a power conversion circuit comprising a first power conversion circuit port and a second power conversion circuit port, the first transformer winding coupled to the first power conversion circuit port, the second transformer winding is connected to the second conversion circuit port, the first transformer winding and the second transformer winding are capable of transferring energy to each other through electromagnetic mutual inductance, and the power conversion circuit is coupled to the alternating current/direct current conversion circuit.

23. An electric vehicle, comprising a power battery, an auxiliary battery, and a charger, wherein
the charger comprises an alternating current/direct current conversion circuit; and
a power conversion circuit, comprising:
- a magnetic core with a window in the magnetic core;
- a first transformer winding that passes through the window and is wound around the magnetic core;
- a second transformer winding that passes through the window and is wound around the magnetic core, wherein the first transformer winding and the second transformer winding are separated, and a first air gap is formed at separation between the first transformer winding and the second transformer winding;
- a magnetic cylinder that is located in the window and located between the first transformer winding and the second transformer winding, wherein one side of the magnetic cylinder comes in contact with the magnetic core, and there is a gap between the other side of the magnetic cylinder and the magnetic core; and
- a power conversion circuit comprising a first power conversion circuit port and a second power conversion circuit port, the first transformer winding coupled to the first power conversion circuit port, the second transformer winding is connected to the second conversion circuit port, the first transformer winding and the second transformer winding are capable of transferring energy to each other through electromagnetic mutual inductance, and the power conversion circuit is coupled to the alternating current/direct current conversion circuit; and the first port of the power conversion circuit in the charger is coupled to the power battery, and a third port of the power conversion circuit is coupled to the auxiliary battery.

* * * * *